Nov. 21, 1950    N. N. ESTES ET AL    2,530,383
MICROPHONE TESTING DEVICE
Filed Sept. 3, 1947

Inventors
N. N. Estes
L. Fleming
By M. O. Hayes
Attorney

Patented Nov. 21, 1950

2,530,383

UNITED STATES PATENT OFFICE 2,530,383

MICROPHONE TESTING DEVICE

Nelson N. Estes, Austin, Tex., and Lawrence Fleming, Falls Church, Va.

Application September 3, 1947, Serial No. 771,958

16 Claims. (Cl. 179—175.1)

(Granted under the act of March 3, 1883, as amended April 30, 1928; 370 O. G. 757)

This invention relates to improvements in apparatus for testing microphones, and more particularly to apparatus having an acoustic coupler for coupling the microphone to be tested to a source of acoustic energy in such a manner as to provide substantially uniform acoustic characteristics over a wide range of acoustic frequencies and to minimize the transmission of energy directly through the wall of the coupler between source and microphone whereby voltage response frequency characteristics of microphones tested with the apparatus of the subject invention closely simulate the characteristics obtained under free field test conditions.

In apparatus heretofore employed for the purpose of testing microphones, and having means for coupling the microphones to sources of acoustic energy, it has usually been impossible to avoid pronounced mechanical and acoustical resonant effects lying within the frequency response range which it was desired to measure. As is well known, an enclosed body of air has a major acoustic resonant frequency determined by the volume enclosed, and minor resonant effects may be caused by a variety of other factors. For example, factors of shape influence the resonant frequency effects; fins, rough edges, or like irregularities in the walls of the enclosing structure may result in minor resonant peaks in a response curve obtained with the coupler; and leaks in the coupler walls have pronounced resonant effects. Furthermore, mechanical resonant effects may exist in the walls of the acoustic coupler. In prior art devices, one such resonant effect is produced by the mass of the microphone coacting with the longitudinal stiffness of the connecting wall of the coupler.

Any of these resonant effects occurring in the frequency range over which it is desired to test the voltage response frequency characteristics or other characteristics of the microphone result in undesirable errors in measurement which must be corrected for by computation or by taking repeated test runs on a variety of couplers. Unfortunately, such resonant effects usually occur at frequencies in the useful frequency range of the test microphone, for example, in the low and medium audible ranges.

The convoluted-wall coupler of the subject invention avoids some resonant effects by lowering the major mechanical resonant frequency to a frequency below the range in which it is usually desired to obtain voltage response frequency characteristic curves. The coupler of the subject invention also provides an arrangement in which substantially no energy is transmitted through the wall of the coupler from the source of acoustic energy to the microphone under test.

An object of the invention is to provide a new and improved apparatus for testing microphones.

Another object of the invention is to provide new and improved microphone testing apparatus which will provide for voltage response frequency characteristics closely approximating the free field response characteristics of the microphone.

Another object is to provide new and improved microphone testing apparatus having an acoustic coupler characterized by a very low frequency of major mechanical resonance when employed with a test microphone.

Another object of the invention is to provide new and improved microphone testing apparatus having a coupler with a flexible wall adapted to insulate the microphone under test from vibration of the table or support upon which the test apparatus rests.

A further object is to provide new and improved microphone testing apparatus in which the mechanical resonance of the coupler and the microphone under test is readily suppressed.

A still further object of the invention is to provide new and improved microphone testing apparatus having a coupler of which the wall thereof transmits substantially no energy directly between the source of energy and the microphone under test.

Other objects and advantages will be apparent after perusal of the following description read in connection with the accompanying drawings, in which.

Figure 1:
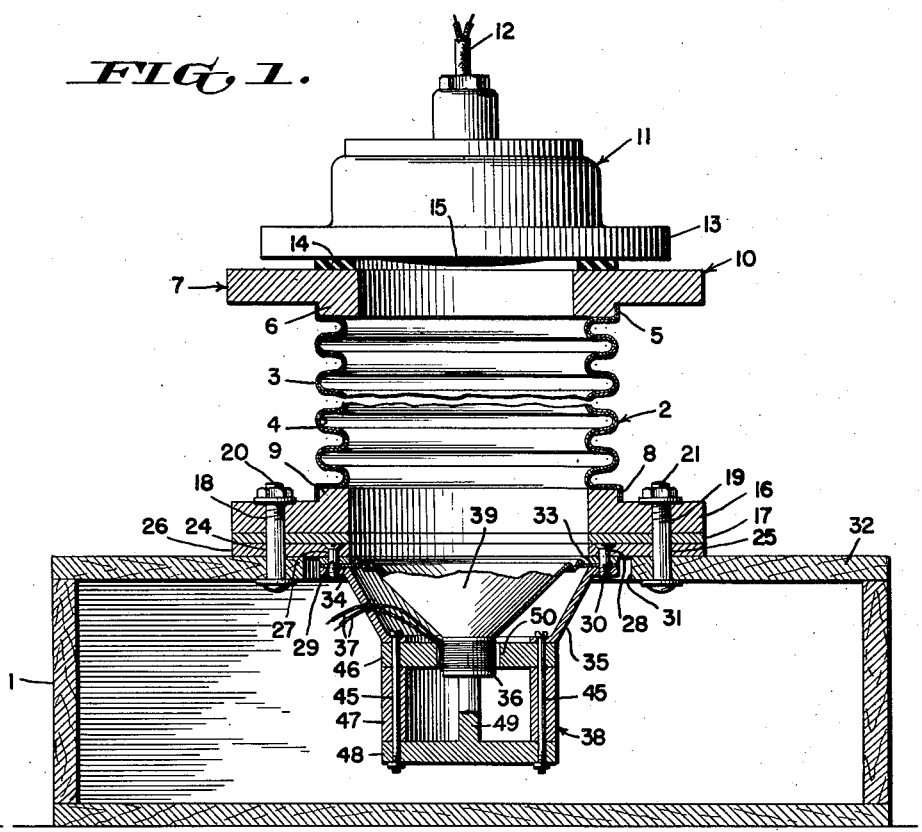
Fig. 1 is a cross-sectional view of the testing apparatus of the present invention and including the coupler according to one embodiment thereof.

Referring now to the drawings in which like reference characters are used throughout to designate like parts, and more particularly to Fig. 1 thereof, there is shown at 1 a supporting stand for a source of acoustic energy or speaker generally designated by the reference numeral 38, and which may be of any convenient design, in the present instance a dynamic type speaker. The supporting stand 1, which may be a box or housing having at least one end or side open, or may be of any other convenient design, may be constructed of any suitable material, such as wood, so long as the material has substantial rigidity, has an upper cover plate 32 having a circular, centrally disposed orifice 31 therein. A flat annular ring 26 composed of brass or other suitable material, rests upon the upper surface of plate 32, being fixed thereto by bolts, such as 20 and 21, passing through bores such as 24 and 25 in ring 26 and registering bores in cover 32. The ring 26 also has additional bores therein, such as 27 and 28, for receiving screws such as 29 and 30, which pass through registering bores in a spacing washer 33, thence through registering bores in the flange portion 34 of speaker diaphragm or cone 39, and thence through registering bores in the flange portion of a truncated conical housing 35, the bores in housing 35 being threaded to receive the threaded ends of screws 29 and 30, which securely fix together the mounting ring 26, spacing washer 33, speaker cone flange 34, and speaker cone housing 35. Fixed to the housing 35, as by screws 45, are the magnetic members 46, 47, and 48, which, with central core piece 49, form a magnetic circuit, the lines of flux extending through the central aperture 50 in member 46 to pole 49. Mounted within this aperture is a coil 36 fixed to a cone 39 to vibrate therewith, and having leads 37 for bringing an alternating current to the coil; the coil, cone, and permanent magnetic circuit resulting in the generation of acoustic energy when the coil is energized by an alternating current of a suitable frequency, in a manner well known to those skilled in the art.

The acoustic coupler, generally designated by the reference numeral 10, is mounted upon the housing 1 adjacent the aperture 31 for speaker 38. The coupler comprises an upper annular ring 7 composed of brass or other suitable material having a depending shoulder portion 6 for receiving the lip 5 of a coupling member having a convoluted tubular wall preferably generally cylindrical in shape and denoted by the reference numeral 2. Coupling member 2 is composed of spun brass, or other suitable material, and is preferably of double wall construction, having inner and outer wall sections 4 and 3 respectively, and having any desired number of convolutions, for example, nine. The lower lip 8 of coupling member 2 encloses the shoulder 9 of a lower annular ring 16 also composed of brass, or other suitable material, and having bores 18 and 19 therein for receiving the aforementioned screws 20 and 21 respectively. These screws have nuts which firmly secure the annular member 16 to cover plate 32 of box 1, a flat sealing gasket 17 composed of any suitable material such, for example, as brass being interposed between member 16 and annular ring 26 to form an acoustic seal therebetween.

The upper annular ring 10 has disposed thereon a gasket 14 of soft rubber, or other suitable material, upon which rests the face plate or flange 13 of a microphone 11 to be tested, the weight of the microphone 11 upon gasket 14 resulting in a substantially hermetical seal between the microphone and coupler 10. The diaphragm 15 is adapted to pass acoustic energy to the transducing portion of the microphone, cable 12 being provided for delivering the energy output of the microphone to suitable indicating apparatus hereafter to be described.

The aforedescribed construction of the wall of coupler member 2 provides a wall characterized by radial stiffness and longitudinal flexibility. The wall by reason of its flexibility provides a mechanical path between speaker 38 and microphone 11 of low transmission of energy therethrough, as will be readily understood by those skilled in the art to which the invention pertains.

The longitudinal flexibility of the wall of member 2 further provides that the microphone 11 is substantially insulated from shocks reaching the housing 1 during tests, so that no irregularities due to these shocks occur in the response curve obtained for the microphone under test.

Figure 3:
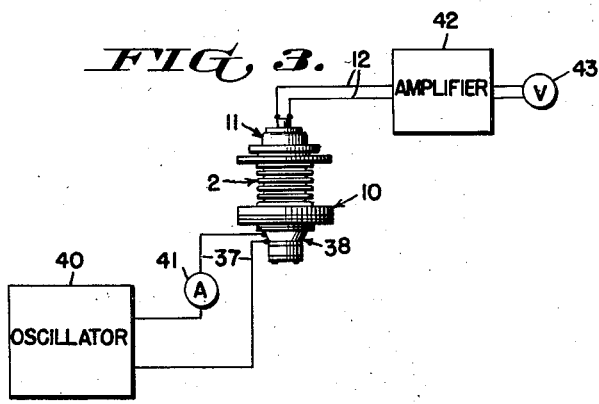
Fig. 3 is a diagrammatic view of a complete electrical system for testing microphones in accordance with the preferred arrangement of the present invention.

Reference is made now to Fig. 3, wherein there is shown a variable frequency oscillator 40 which may be of conventional design and which includes means for adjusting the amplitude of the output voltage thereof. Oscillator 40 has its output connected through aforementioned leads 37 to the speaker 38, one lead having in series therein a current indicating device 41, which may be of conventional design. Whereas tests employing the apparatus and coupler of the subject invention may of course be conducted under conditions of constant voltage across the speaker coil, constant current into the speaker coil, constant power into the speaker coil, or any other desired condition, it has been found convenient, when testing microphones to obtain the voltage response frequency characteristics thereof, to maintain the current constant as the frequency of the oscillator is changed, and such an arrangement is shown in Fig. 3. The microphone 11 delivers its output through aforementioned leads 12 preferably to a voltage amplifier 42 having a voltmeter or other output indicating device 43 in the output thereof, the voltage indicated on the meter 43 as the frequency of oscillator 40 is varied giving, after suitable calculation, a measure of the voltage frequency response characteristic of the microphone under test. It is of course understood that the meter 43 may be directly calibrated in decibels with respect to a selected reference level, if desired, in a manner well known to those skilled in the art.

The convoluted wall type of construction for the coupler member 2 suppresses the effects of mechanical resonance of the coupler and microphone. In prior art couplers, the stiffness of the wall of the coupler, plus the microphone mass, provide a mechanical system which oscillates when excited by energy at its natural resonant frequency. As aforementioned, the convoluted wall coupler of the instant arrangement is rigid radially but slightly compressible longitudinally, which flexibility provides for a minimum of coupling between the microphone and the source of energy thereby inhibiting the generation of oscillations which would tend to be set up within the aforementioned oscillatory system comprising the walls of the coupler and the mass of the microphone.

Moreover, the flexible wall construction of the coupler tends to shift the major mechanical resonant frequency to a point well below the frequency range in which test results are most often desired. The exact frequency of such mechanical resonance is determined by the material, weight, and dimensions of the coupler and dimensions and weight of the microphone under test. A coupler having, for example, nine convolutions and a volume of approximately 2000 c. c., and a microphone weighing, for example, 15 pounds would produce a mechanical resonant frequency of the assembly in the neighborhood of 7 C. P. S.

As is well known in the art, there is also a major resonant frequency normally encountered in acoustic couplers due to the volume of air. This, in a coupling chamber of the volume mentioned hereinbefore, may be expected to be in the neighborhood of 1000 C. P. S. Between the upper major acoustic resonance, and the lower major mechanical resonance, the voltage response frequency characteristic curve of the microphone may be obtained substantially without distortion, thereby simulating test results obtained under free field test conditions.

In practice, voltage response frequency characteristics obtained with the coupler of the subject invention have been found to closely approximate the free field response of the microphone under test.

Figure 2:
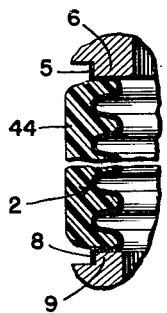
Fig. 2 is a cross-sectional view of a fragmentary portion of the coupler according to the preferred embodiment thereof.

Reference is made now to Fig. 2, which shows the preferred embodiment of the coupling member 2 of the invention, in which a damping material 44, such as mechanical damping materials known in the trade as Vinylite and Viscoloid, is disposed around the outside thereof. The damping material provides predetermined flexibility characteristics for the coupler walls, tending to suppress minor resonant effects and thereby increasing the closeness with which the voltage response frequency characteristic of a microphone tested with the apparatus of the subject invention resembles the free field response.

Whereas we have shown and described the coupler wall or member 2 as being preferably cylindrical in shape, it is understood that the coupler wall may have other shapes if desired, for example, it may be square or octagonal, or it may be of truncated conical shape, and the word "tubular" as employed herein is intended to include any desired shape.

Whereas we have shown and described the coupler of our invention as having all the corrugations of substantially uniform dimensions, it is understood that, if desired, they may be of different dimensions.

Whereas we have shown and described the coupler wall as being of double-wall construction, it is understood that single wall construction could be employed, if desired, and also multiple-wall construction of any desired number of portions.

The word "acoustic" as employed herein is defined as including energies of sonic, supersonic, and sub-sonic frequencies.

Whereas we have shown and described the damping material of Fig. 2 as filling the spaces between convolutions, if desired, a smaller amount of damping material may be employed, disposed in juxtaposition to and contacting the convolutions of the coupler wall at any convenient areas thereof.

Whereas we have shown and described our invention with respect to a specific circuit arrangement and with respect to certain embodiments of the coupler wall which give satisfactory results, it is understood that modifications and changes may be made therein without departing from the spirit or scope of the invention, and it is our intention therefore in the appended claims, to include all such modifications and equivalents.

This invention may be manufactured and used by or for the Government of the United States of America for governmental purposes without the payment of any royalties thereon or therefor.

What is claimed as new and desired to be secured by Letters Patent of the United States is:

1. In apparatus of the character disclosed, in combination, a source of acoustic energy, and means forming an acoustic chamber for coupling the source to a microphone, said means including a tubular wall portion having the ends thereof respectively closed and hermetically sealed by the microphone and source of acoustic energy, the diameter of said wall portion alternately increasing and decreasing along the length thereof whereby said wall portion is characterized by radial stiffness and longitudinal flexibility, thereby to dampen spurious vibrations of the microphone in response to random shocks received by said source.

2. In apparatus of the character disclosed, in combination, a microphone, means for generating acoustic energy, coupling means forming an acoustic chamber for coupling said generating means to the microphone, said coupling means including a coupling member generally tubular in shape and having the ends thereof open, and means for hermetically sealing said microphone and said acoustic energy generating means respectively to the ends of said coupling member, the diameter of said coupling member alternately increasing and decreasing along the length thereof to form a side wall characterized by radial stiffness and longitudinal flexibility thereby to provide a mechanical path of high impedance between said microphone and said generating means whereby the transmission of energy through the wall between said generating means and said microphone is continuously maintained at a low value.

3. In apparatus of the character disclosed, in combination, a microphone to be tested, a transducer, means connected to said transducer for generating an alternating current of predetermined frequencies and applying said current in predetermined value to the transducer thereby to energize the latter, means forming an acoustic chamber for coupling said transducer to said microphone, said chamber forming means having a tubular wall portion, said transducer being disposed at one end of said chamber forming means in hermetically sealed engagement therewith, said microphone being disposed at the other end of said chamber forming means in hermetically sealed engagement therewith, and means including a calibrated output meter operatively connected to said microphone for indicating the value of the voltage generated thereby in response to signals received from the transducer, said wall portion alternately increasing and decreasing in diameter along the length thereof whereby the wall is characterized by radial stiffness and longitudinal flexibility and provides a mechanical path of low transmission between said microphone and said transducer which maintains the transmission of energy through the wall at a low value.

4. In apparatus of the character disclosed, in combination, a microphne to be tested, a circuit including a source of acoustic energy adapted to generate energy selectively at a plurality of different frequencies, calibrated means electrically connected with said source in said circuit and providing means for indicating when the acoustic energy is at a predetermined value, coupling means comprising a closed body of fluid interconnecting said source and the microphone under test for transmitting acoustic energy through the fluid between the source and the microphone, and means operatively connected to the microphone for measuring the output thereof in response to acoustic energy received thereby, said coupling means comprising a tubular convoluted wall hermetically engaged at the ends thereof with said microphone and source respectively thereby to enclose said body of fluid and to prevent substantially all mechanical coupling between said microphone and said source and to provide high uniformity of acoustic characteristics over a wide range of acoustic frequencies.

5. In a device of the character disclosed for coupling a microphone to a source of acoustic energy, acoustic coupling means forming a chamber, said means being generally tubular in shape, said means having inner and outer walls and having the ends thereof open for providing communication through the chamber between the microphone and source of acoustic energy, both of said walls alternately increasing and decreasing together in diameter along the length of said chamber whereby convolutions are formed, said walls being rigid radially and flexible longitudinally, each of said walls having lip portions at both ends thereof, and a pair of annular members respectively disposed adjacent the ends of the walls, each of said annular members having a shoulder portion adapted to be tightly engaged by adjacent lip portions of the walls, said annular members being adapted to be engaged in substantially hermetically sealed engagement by said microphone and source of acoustic energy respectively, said chamber and annular members being adapted to enclose a substantially sealed volume of fluid when the microphone and source of acoustic energy are attached respectively thereto.

6. A device according to claim 5 including in addition a quantity of damping material disposed around the outside of said chamber and at least partially filling the spaces between said convolutions whereby the acoustic impedance of the chamber wall is given a predetermined characteristic.

7. In apparatus of the character disclosed, the combination of a source of acoustic energy, and means forming an acoustic chamber for coupling a microphone to the source, said chamber having a body of fluid therein, said means having a wall portion shaped generally in the form of a tube and having open ends for providing communication through the chamber and fluid between the microphone and source of acoustic energy, said ends having means for receiving said source and the microphone in substantially hermetically sealed engagement therewith respectively thereby to hermetically enclose said fluid in said chamber, said wall portion periodically increasing and decreasing in diameter along the length thereof whereby said wall portion is rendered radially rigid and longitudinally flexible and substantially the entire energy reaching said microphone from said source is transmitted through the enclosed fluid.

8. In apparatus of the character disclosed, in combination, means for generating acoustic energy, and a coupler for coupling said generating means to a microphone, said coupler having means forming with said generating means and said microphone a completely enclosed chamber arranged to contain a body of fluid through which the acoustic energy is transmitted from the generating means to the microphone, said coupler having a corrugated wall structure which renders the wall longitudinally flexible and maintains the transmission of energy through the wall of the coupler from the generating means to the microphone at a low value.

9. Apparatus according to claim 8 including in addition a filler of damping material disposed around the outside of the wall of said coupler and at least partially filling the spaces between the corrugations of the wall whereby the wall is given predetermined energy transmission characteristics.

10. In apparatus of the character disclosed, in combination, a microphone to be tested, a housing formed of substantially rigid material and having an aperture therein, an acoustic transducer mounted within said housing adjacent said aperture, means connected to said transducer for exciting the same and generating acoustic wave energy, acoustic coupling means for coupling the transducer to the microphone, said acoustic coupling means having a convoluted wall portion generally tubular in shape and forming a chamber having open ends said ends having means in sealed engagement with said transducer and the microphone respectively, said acoustic coupling means being mounted upon said housing with one end in registration with said aperture, the microphone to be tested being mounted upon the other end of said acoustic coupling means, the wall portion of said acoustic coupling means periodically increasing and decreasing in diameter along the length thereof to provide a wall having longitudinal flexibility, and output indicating means operatively connected to said microphone, said convoluted wall portion being sufficiently flexible to insulate said microphone from random movements of said housing and to transmit substantially no acoustic energy directly between said transducer and said microphone.

11. In apparatus of the character disclosed for testing a microphone, in combination, means for generating a predetermined amount of acoustic energy selectively at a plurality of frequencies, means for coupling said generating means to the microphone to be tested, said coupling means including a convoluted tubular wall portion having longitudinal flexibility and forming a closed acoustic chamber with said generating means and said microphone, and means connected to the microphone to be tested for measuring the output thereof in response to acoustic energy received thereby from said generating means, said wall portion being sufficiently flexible to provide substantially no direct transmission of acoustic energy between the generating means and the microphone through said wall portion.

12. Apparatus according to claim 11 including in addition damping means comprising a quantity of damping material disposed around the outside of said coupling means in contact therewith and adapted to provide predetermined energy transmission characteristics for said coupling means.

13. In apparatus of the character disclosed, the combination of means for generating acoustic energy, and means for coupling said generating means to a microphone, said coupling means including means forming a closed acoustic chamber with said generating means and said microphone, said coupling means having a tubular convoluted wall portion for interposing a low transmission path between the microphone and the generating means whereby the transmission of energy therebetween through said wall portion is reduced to a quantity ineffective to produce appreciable distortion in the response characteristics of the microphone.

14. Apparatus according to claim 8 including in addition a quantity of damping material disposed around the outside of said wall in juxtaposition to and contacting the corrugations of the wall whereby said damping material suppresses vibrations of acoustical frequency occurring in portions of said wall.

15. Apparatus according to claim 1 including in addition a quantity of damping material disposed around the outside of said wall portion and contacting at least a portion of the area of said wall whereby said damping material further suppresses vibration of said microphone.

16. In apparatus of the character disclosed, in combination, a microphone, means for generating acoustic energy, coupling means forming an acoustic chamber for coupling said generating means to the microphone, said coupling means including a coupling member generally tubular in shape and having the ends thereof open, and means for hermetically sealing said microphone and said acoustic energy generating means respectively to the ends of said coupling member, said coupling member being characterized by radial stiffness and longitudinal flexibility thereby to provide a mechanical path of high impedance between said microphone and said generating means whereby the transmission of energy through the wall between said generating means and said microphone is continuously maintained at a low value.

NELSON N. ESTES.
LAWRENCE FLEMING.

REFERENCES CITED

The following references are of record in the file of this patent:

UNITED STATES PATENTS

| Number | Name | Date |
|---|---|---|
| 1,909,511 | Wilson | May 16, 1933 |
| 2,065,578 | Glen | Dec. 29, 1936 |
| 2,089,492 | Lambert | Aug. 10, 1937 |
| 2,125,850 | Norris | Aug. 2, 1938 |
| 2,233,804 | Bourne | Mar. 4, 1941 |
| 2,249,131 | Hartmann | July 15, 1941 |
| 2,394,613 | Houlgate | Feb. 12, 1946 |

FOREIGN PATENTS

| Number | Country | Date |
|---|---|---|
| 55,937 | Denmark | Feb. 27, 1939 |